US009056642B2

(12) United States Patent
Onyeka

(10) Patent No.: US 9,056,642 B2
(45) Date of Patent: Jun. 16, 2015

(54) RETRACTABLE NOSE SADDLE

(76) Inventor: George Chidumam Onyeka, London (GB)

( * ) Notice: Subject to any disclaimer, the term of this patent is extended or adjusted under 35 U.S.C. 154(b) by 125 days.

(21) Appl. No.: 13/823,241

(22) PCT Filed: Sep. 27, 2011

(86) PCT No.: PCT/GB2011/001403
§ 371 (c)(1),
(2), (4) Date: Mar. 14, 2013

(87) PCT Pub. No.: WO2012/042204
PCT Pub. Date: Apr. 5, 2012

(65) Prior Publication Data
US 2013/0181491 A1      Jul. 18, 2013

(30) Foreign Application Priority Data

Sep. 29, 2010   (GB) .................................. 1016319.4

(51) Int. Cl.
*B62J 1/00*       (2006.01)
(52) U.S. Cl.
CPC .. *B62J 1/00* (2013.01); *B62J 1/005* (2013.01); *B62J 1/007* (2013.01)
(58) Field of Classification Search
CPC .................... B62J 1/005; B62J 1/10

USPC ........ 297/201, 195.11, 423.2, 423.22–423.24
See application file for complete search history.

(56) References Cited

U.S. PATENT DOCUMENTS

| | | | | |
|---|---|---|---|---|
| 620,946 A * | 3/1899 | Mieselbach et al. | .......... | 297/202 |
| 4,563,038 A * | 1/1986 | Hirose | .......... | 297/243 |
| 5,203,606 A * | 4/1993 | Granzotto | .......... | 297/201 |
| 5,709,430 A * | 1/1998 | Peters | .......... | 297/201 |
| 5,713,629 A * | 2/1998 | Plackis | .......... | 297/236 |
| 6,139,098 A * | 10/2000 | Carrillo | .......... | 297/202 |
| 6,152,524 A * | 11/2000 | Cox | .......... | 297/201 |
| 6,290,291 B1 * | 9/2001 | Kojima | .......... | 297/201 |
| 6,357,825 B1 * | 3/2002 | Bavaresco | .......... | 297/201 |
| 6,575,529 B1 * | 6/2003 | Yu | .......... | 297/201 |
| 7,500,717 B2 * | 3/2009 | Bigolin | .......... | 297/201 |

FOREIGN PATENT DOCUMENTS

| | | | | | |
|---|---|---|---|---|---|
| DE | | 19932031 A1 * | 1/2001 | ................. | B62J 1/00 |
| WO | WO 2009040771 A1 * | | 4/2009 | ................. | B62J 1/00 |

* cited by examiner

*Primary Examiner* — David R Dunn
*Assistant Examiner* — Tania Abraham

(57) ABSTRACT

A retractable nose saddle comprising a sliding assembly (3) underneath the saddle parts (5, 2), which enables the separate nose portion (2) to be moved underneath or into the noseless saddle portion (5) to form a noseless saddle or to be moved back out from underneath or from within the noseless portion (5) to form a nosed saddle again.

5 Claims, 5 Drawing Sheets

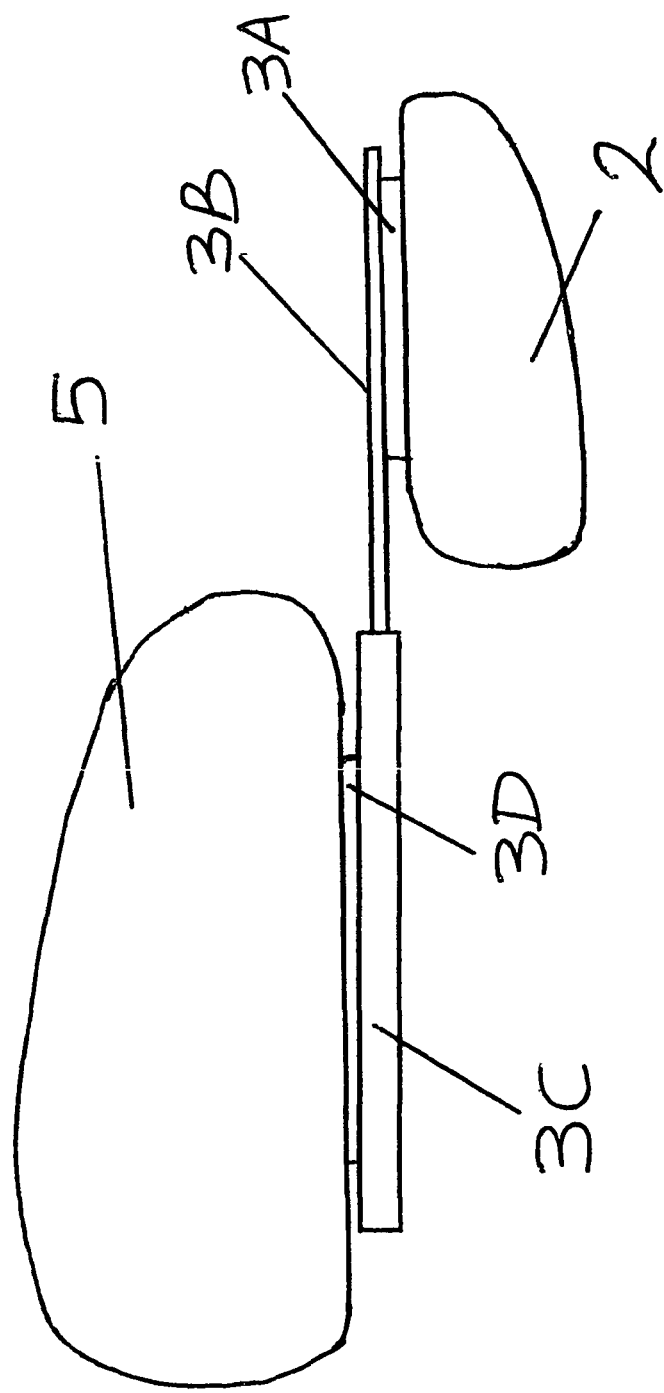

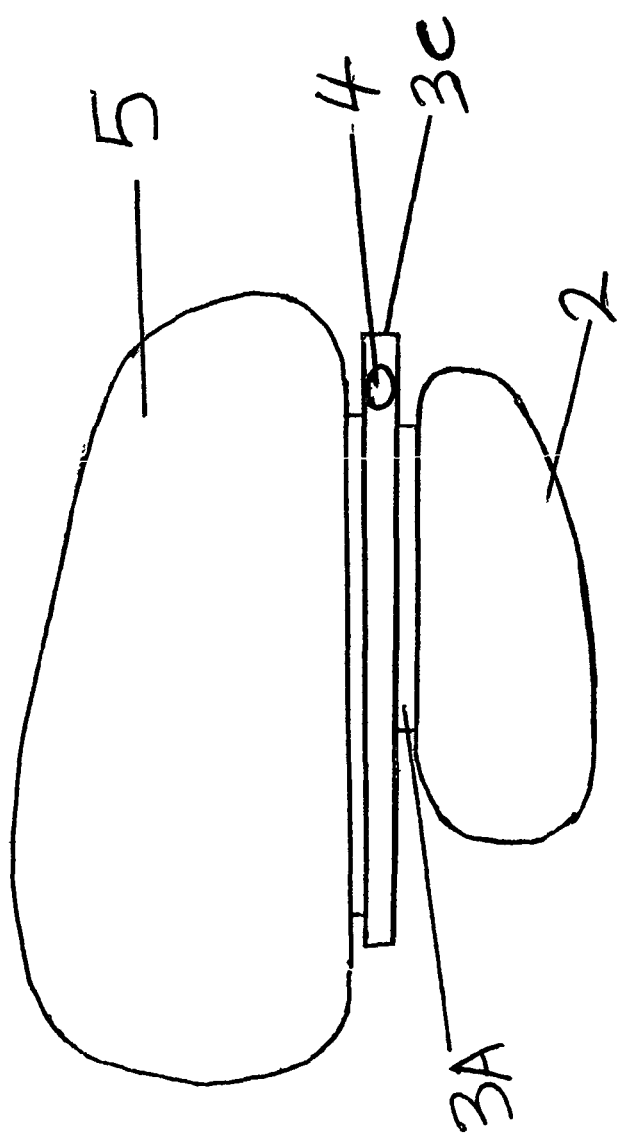

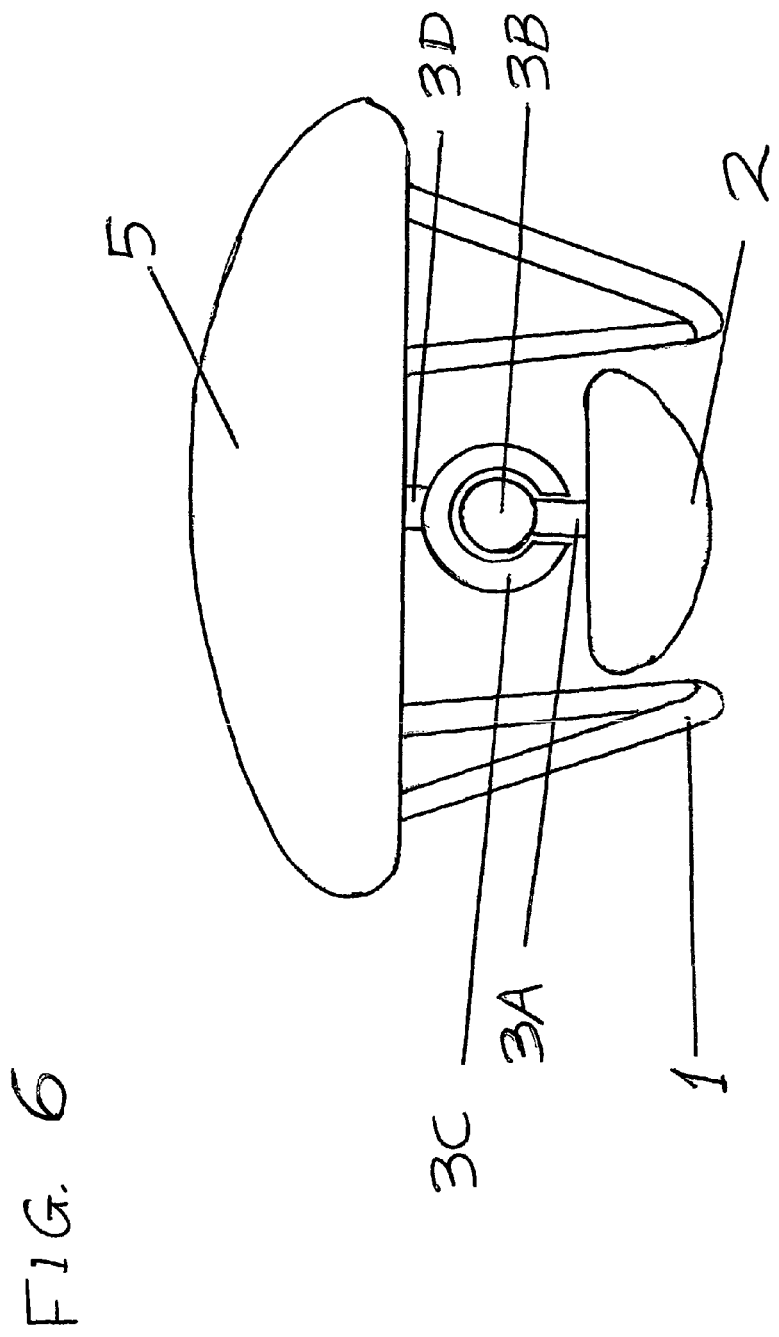

RETRACTABLE NOSE SADDLE

BACKGROUND

Cycling is one of the most enjoyable and accessible of activities. It not only provides exercise, but also enables the user to travel to a different location—for work or pleasure, thus saving money, reducing the pollution of the environment by use of motor vehicles.

However many saddle designs have a long nose, which can irritate the perineum region of the body.

Many manufacturers have solved this problem by designing noseless saddles.

However one criticism of the noseless saddle is that it results in loss of control by the user (although this control can be regained by retraining).

Advantages

The advantages of this invention are twofold:
1) Firstly it gives users the choice of saddle type and so enables accessibility to cycling to a wider group of people.
2) Secondly the saddle includes the option for less or more control of the saddle by retracting or extending the nose, which other saddles do not do, as they are either one or the other.

DRAWINGS

Figure 1:
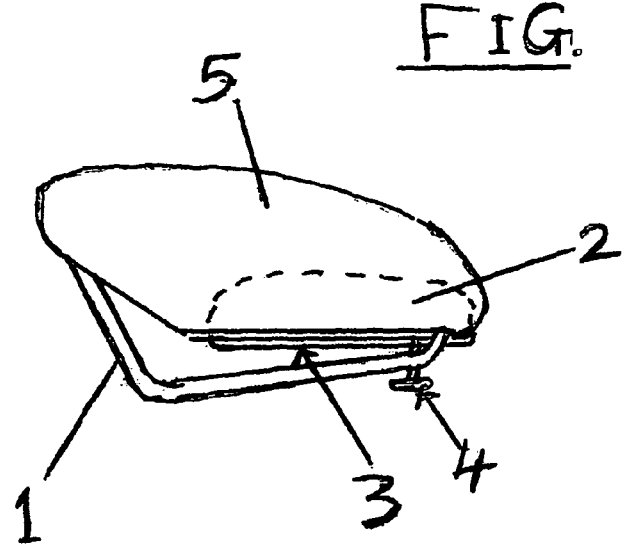
Figure 2:
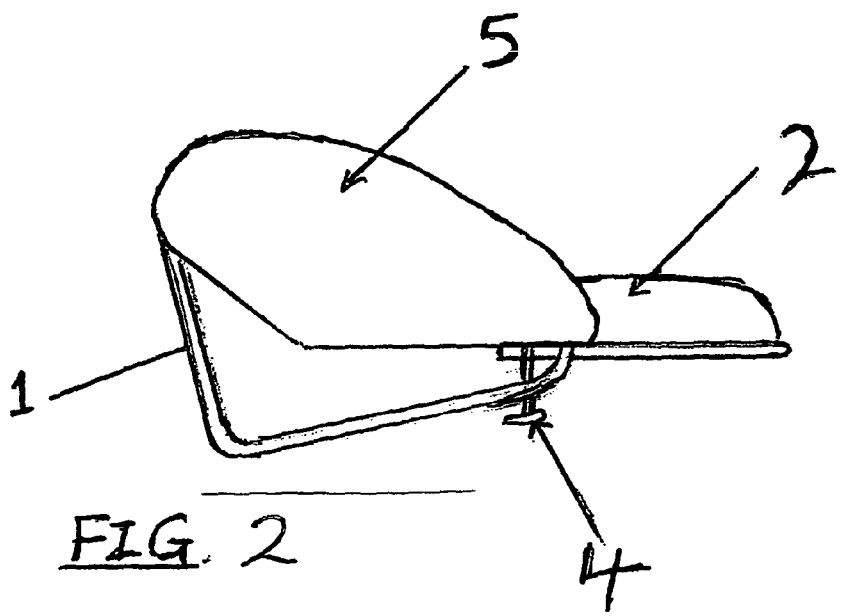
Figure 3:
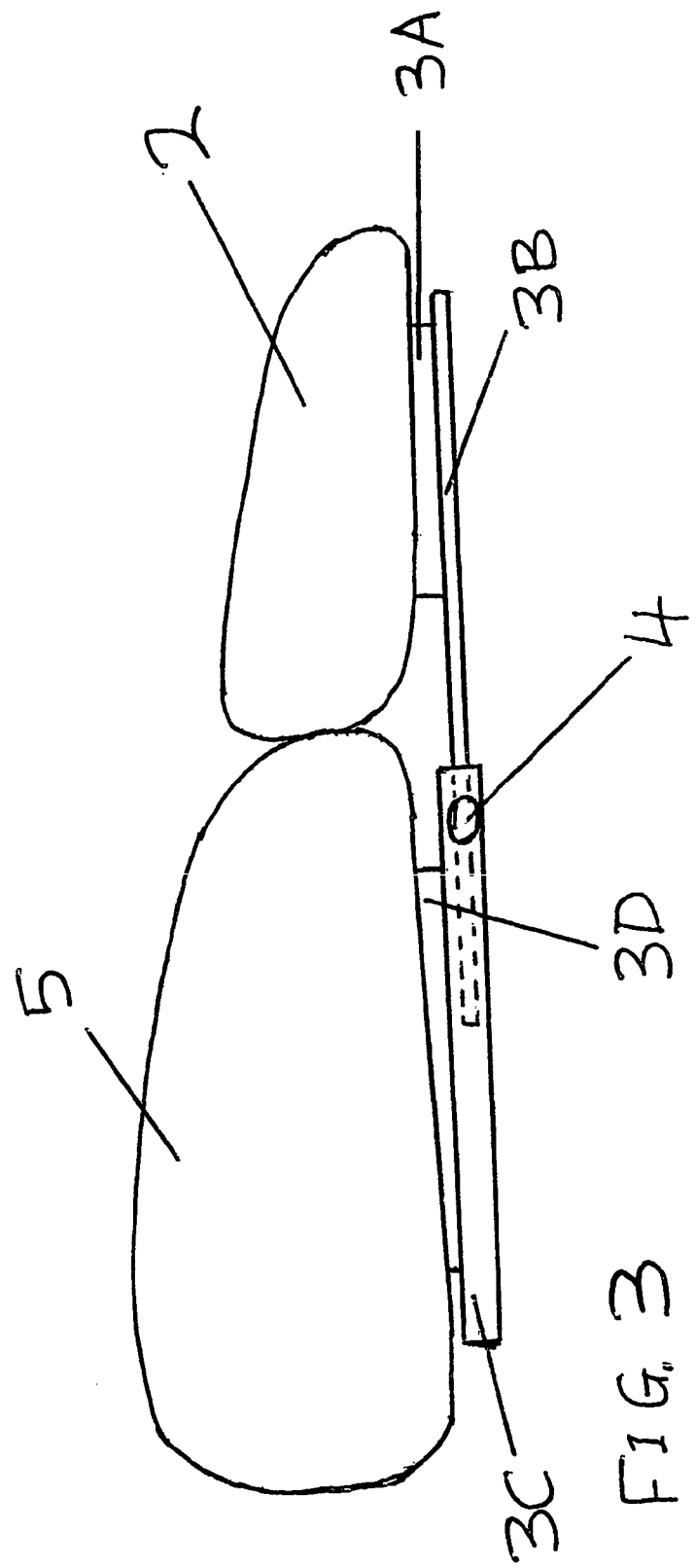

FIG. 1
Side view of a retractable nose saddle with nose retracted.
FIG. 2
Plan View of a retractable nose saddle with nose extended.
FIG. 3
Plan View of a retractable nose saddle with nose extended showing an alternative sliding assembly arrangement
FIG. 4
Plan View of a retractable nose saddle showing an alternative sliding assembly arrangement with nose ready to be retracted
FIG. 5
Plan View of a retractable nose saddle showing an alternative sliding assembly arrangement with nose retracted
FIG. 6
Back View of a retractable nose saddle showing an alternative sliding assembly arrangement with nose retracted

DESCRIPTION

The fixed portion of the frame of the saddle 1 is similar to the rigid portion of a noseless saddle. However the nose section 2 is retractable. This can be achieved in a number of different ways, one of which has been illustrated in FIGS. 1 and 2.

Guide rails or runners 3 (sliding mechanism) are located near the base of the saddle seat post rails 1 as shown in FIGS. 1 & 2, which enable a separate padded nose section 2 to be pushed out into the space that a nose might ordinarily occupy on a normal nosed saddle.

The extent to which the nose is pushed out is adjustable and locking means 4 are provided on the sliding nose (in the pictures the locking means 4 have been located underneath the nose, however this can be located in any suitable position) to lock the nose 2 in position relative to the noseless saddle portion 5.

The locking means illustrated is a releasable bolt 4 that locks the framework 1 (or saddle seat post rail) of the noseless saddle portion 5 to the sliding mechanism 3 of the nose 2 above it, thus preventing movement when the bicycle is in use.

Any other means may be employed to enable the nose portion to be retracted underneath the saddle and held in place by securing means.

Accessing and moving the retracted nose 2 would be from underneath the saddle 5 with the releasable bolt 4 released.

An alternative means of retraction using a series of nested frames of reducing size may be used. When the nose is pushed in, the framework of nested sections is also pushed into the body of the frame, forming a noseless saddle.

If the user then wishes to use the whole nose again, he can push the depressed nose out again from underneath the saddle.

The positioning of the springs, saddle shaft and other supporting parts underneath the saddle, which might impede the extension or retraction of the nose, can be redesigned to ensure that the pathway of the retracting nose 2 is unimpeded.

An example of an alternative sliding mechanism arrangement which enables the nose portion to retract underneath the saddle is illustrated in FIGS. 3 to 6. In these figures the sliding mechanism has been sub-divided into 4 component parts: 3A, 3B, 3C & 3D.

The sliding arrangement has also been attached to the underside of the saddle parts 5 and 2.

The sliding mechanism parts are described as follows: part 3A acts as a guide and is attached to part 3B which is a rod section as well as to the nose portion 2. Part 3D secures part 3C to the noseless saddle portion 5 and ensures alignment of parts 3B and 3C.

Part 3C is a tube section with a cut out groove along its length which not only allows the rod section 3B to move in and out of the tube section, but also allows part 3A to also move along 3C when the nose portion 2 is extending or retracting (see FIGS. 4, 5 and 6).

In this alternative arrangement the locking means 4 is a releasable bolt that locks the rod 3A to the tube 3C.

Any other means of enabling the nose of the saddle to be retracted within the saddle. underneath the saddle or even hinged back underneath the saddle may be employed to achieve a noseless saddle and by reference to the accompanying drawings and description.

STATEMENT OF INVENTION

This invention seeks to solve the problem of irritation of the perineum region of the body but by means of choice. This new saddle therefore has a retractable nose that allows users who prefer the nose and the control it gives them to enjoy this aspect of the saddle, but gives those who do suffer from perineum irritation or who prefer not to use the nose to retract it.

A retractable nose saddle characterized by a nose portion that is retractable using retracting means that both turns and slides the nose to and from its retracted position to allow the saddle to be used as a noseless saddle, said nose portion when not retracted providing the user the option of using the saddle as a regular nosed saddle.

The invention claimed is:
1. A retractable nose saddle comprising: a noseless saddle portion and a retractable nose portion, wherein the retractable nose portion has a retracted position where it is inverted and underneath the noseless saddle portion, and wherein a using retracting means that both turns and slides the retractable nose portion to and from the retracted position to allows the saddle to be used as a noseless saddle, said retractable nose portion when not retracted providing a user the option of using the saddle as a regular nosed saddle.

2. A retractable nose saddle as claimed in claim 1, wherein the retracting means that both turns and slides the retractable nose portion to and from the retracted position is a mechanism which enables the retractable nose portion to be rotated or turned to an inverted position and then to slide underneath the noseless saddle portion of the saddle.

3. A retractable nose saddle as claimed in 2, where a locking means is provided to secure the retractable nose portion in place when in the retracted position or an extended position.

4. A retractable nose saddle as claimed in claim 3, where the locking means provided to secure the retractable nose portion in place is a releasable bolt that locks the retractable nose portion of the saddle to the mechanism.

5. A retractable nose saddle as claimed in claim 3, where the retractable nose portion is able to be partially retracted or extended.

* * * * *